Oct. 8, 1929.  E. W. BRANDT  1,730,800
ORDNANCE MATERIAL
Filed May 26, 1927  4 Sheets-Sheet 1
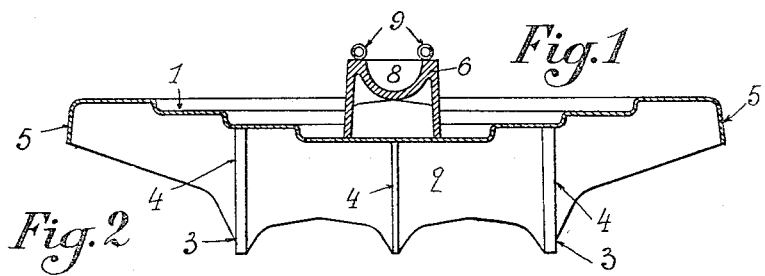
Fig.1
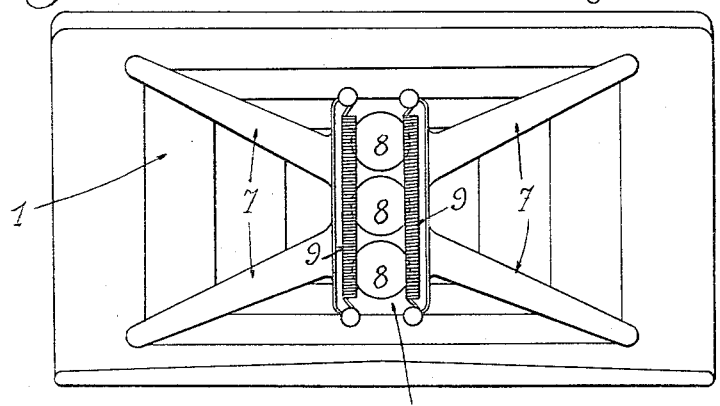
Fig.2
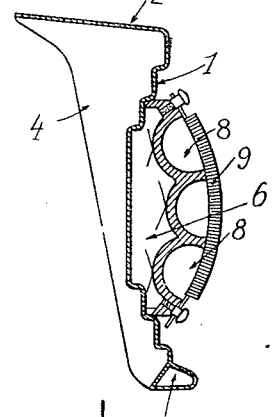
Fig.3
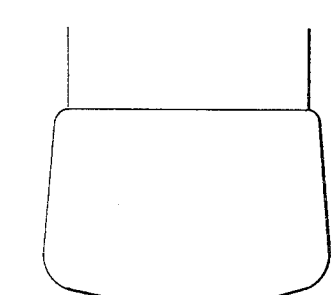
Fig.4
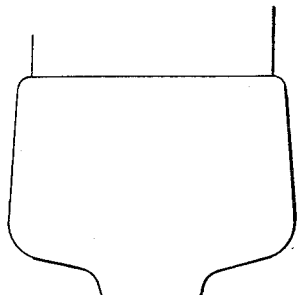
Fig.5
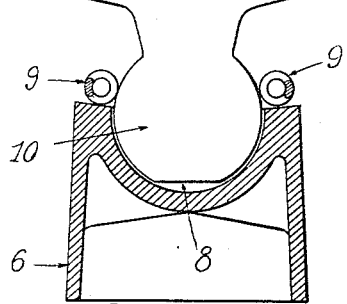
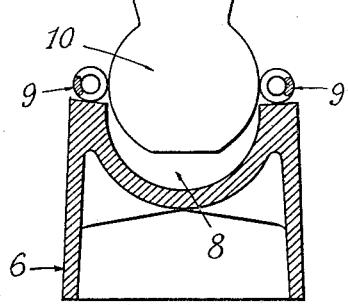
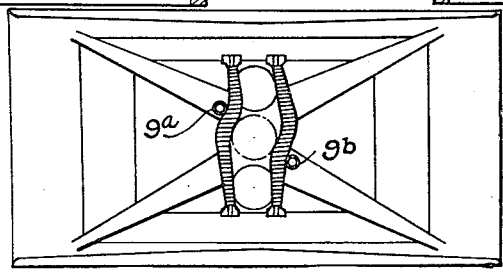
Fig.2ª
E. W. Brandt
INVENTOR
By: Marks & Clerk
Attys.

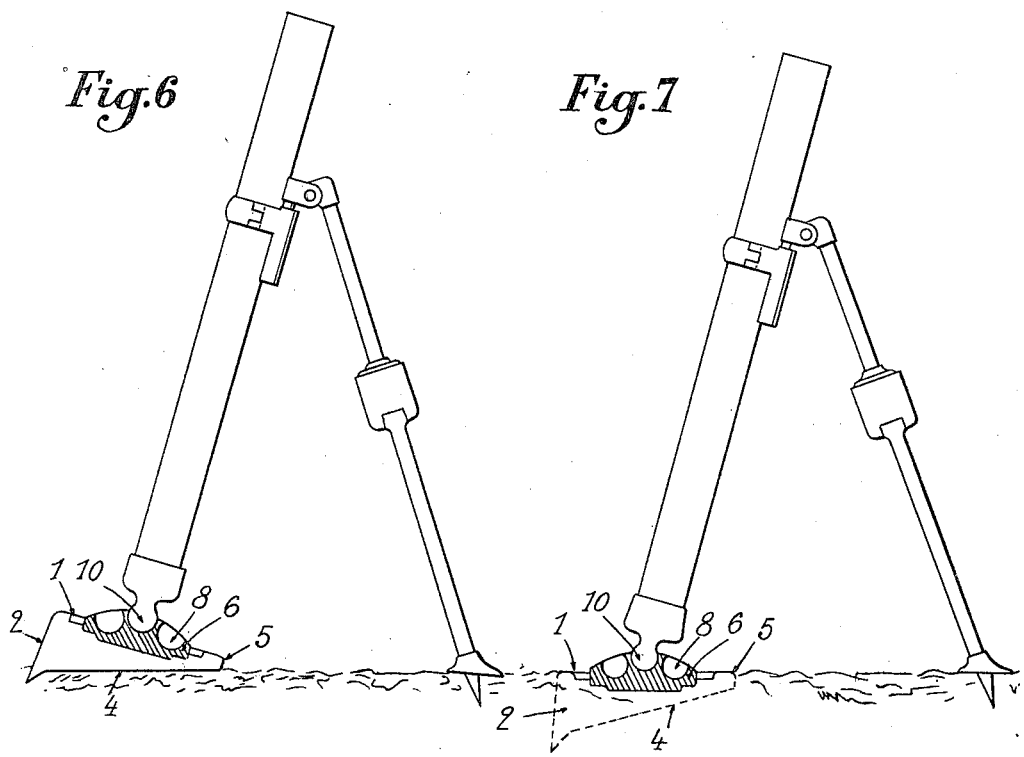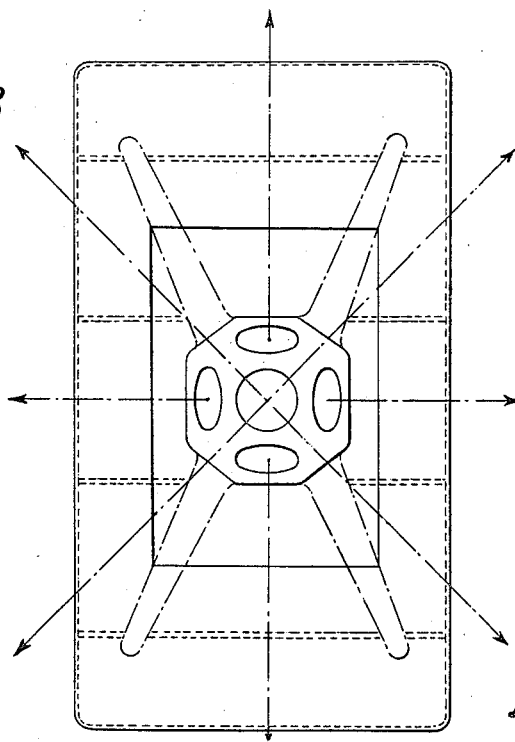

Oct. 8, 1929.   E. W. BRANDT   1,730,800
ORDNANCE MATERIAL
Filed May 26, 1927   4 Sheets-Sheet 3
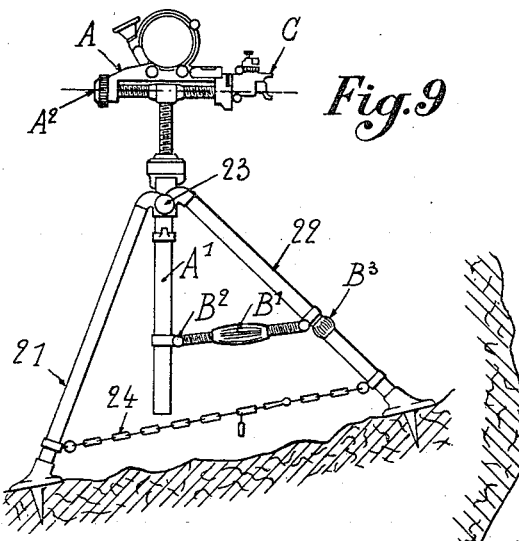
Fig. 9
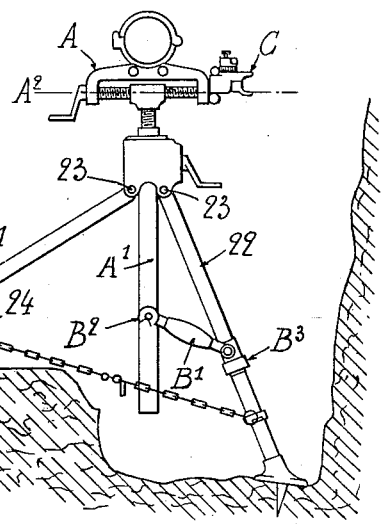
Fig. 10
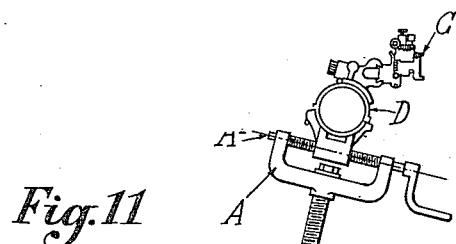
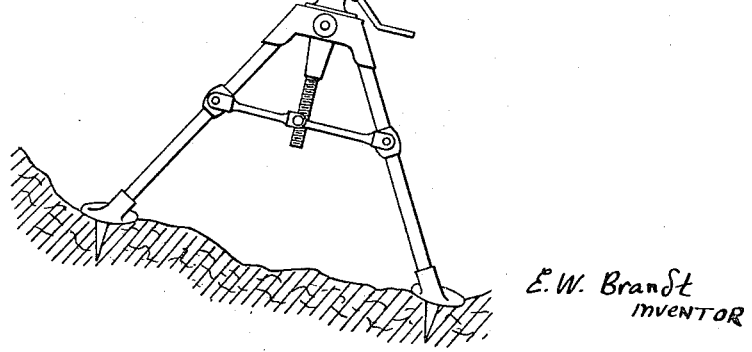
Fig. 11
E. W. Brandt
INVENTOR
By: Marks & Clerk
Attys.

Oct. 8, 1929.  E. W. BRANDT  1,730,800
ORDNANCE MATERIAL
Filed May 26, 1927    4 Sheets-Sheet 4
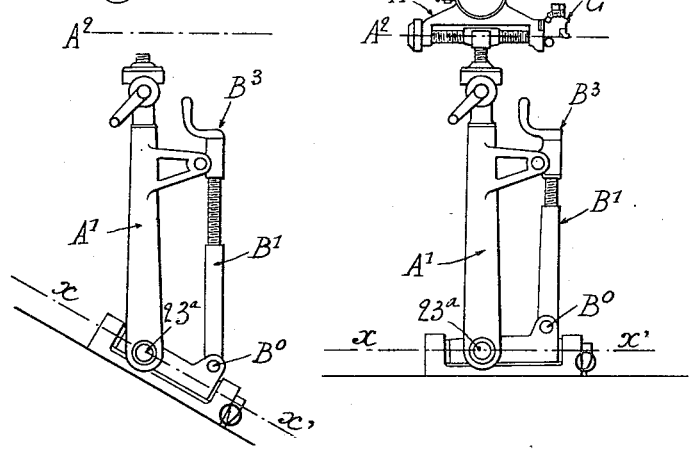
Fig.12ᵃ  Fig.12
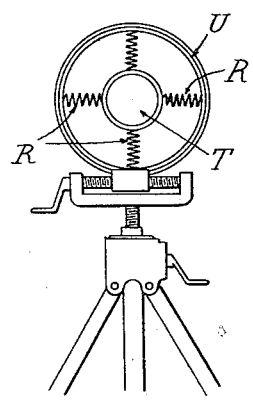
Fig.13
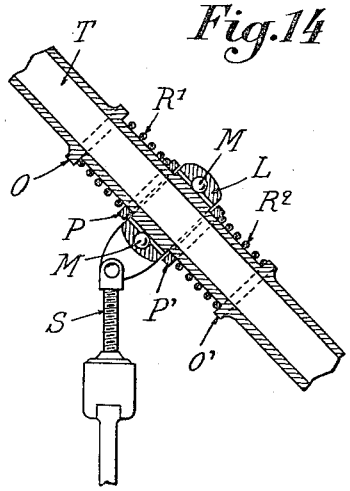
Fig.14
E. W. Brandt
INVENTOR
By: Marks & Clerk
Attys.

Patented Oct. 8, 1929

1,730,800

UNITED STATES PATENT OFFICE

EDGAR WILLIAM BRANDT, OF PARIS, FRANCE

ORDNANCE MATERIAL

Application filed May 26, 1927, Serial No. 194,454, and in France February 15, 1927.

The necessities of the war brought out various artillery apparatus of which a certain number were at first employed in trench operations but afterwards served to accompany and closely follow the infantry in open field operations.

In such circumstances, the major part of the said apparatus proved to be heavy and cumbersome, and could only be transported and set up after long and difficult operations. The greater number of apparatus were unprovided with accurate measuring and aiming devices, which were indeed of minor importance in trench warfare, but became indispensable for operations in the field.

The several improvements according to the present invention are chiefly characterized by the following features, either singly or in combination.

1. The apparatus can be at once mounted upon all ground, and even the most broken ground, in protected positions in shell holes, behind walls, in trenches, in beds of streams, or in like positions, by the use of a base plate of relatively light weight but of rigid construction, which can be placed directly on the ground without any preliminary digging, and becomes firmly anchored in the ground after the first few shots are fired, so that the cannon can then be fired in all directions.

2. The breech block of the cannon tube is adapted to fit into special recesses or sockets which are formed in the said plate, and it is fastened therein in an instantaneous and automatic manner, while it is however simply necessary to give an angular motion to the tube in order to release the said tube from the base plate without effort. The cannon tube which is thus anchored to the base plate during the firing, will have but little recoil, due to the special construction of the said plate. The breech block will never leave its recess during the firing. The recesses are so disposed that the cannon may be fired at any angle irrespectively of the inclination of the base plate relatively to the tube and to the ground.

3. The apparatus can be at once set into battery upon all ground, due to the special arrangement of the cannon mount whereby it will be at once adapted to the configuration of the ground irrespectively of its slope or its broken character, thus assuring firstly the approved stability of the apparatus and secondly the horizontal position of the device employed for the sweeping fire and for the aiming in direction. This latter advantage is important in all cases, but is chiefly valuable as affording accuracy for the curved fire which is generally adopted with this class of apparatus.

4. A very accurate sight may be employed, due to the combined use of the said base plate with automatic fastening, and a device whereby the driving action of the tube upon the mount is retarded, due to the inertia of the mount, the cannon tube being thus made independent of the mount when the shot is fired, so that the mount will remain stationary during the firing.

The improvements according to the invention enable the construction of a very light apparatus which will fire a powerful projectile to a great distance in conditions of precision hitherto unattained, thus offering all the advantages of field artillery and heavy artillery as regards sighting.

Further characteristics of my said improvements will be specified in the following description with reference to the appended drawings which are given solely by way of example and in which:

Fig. 1 is an elevation of a base plate in accordance with the invention.

Fig. 2 is the corresponding plan view.

Fig. 2ª is a fragmentary plan view, showing a modification.

Fig. 3 is a side view.

Fig. 4 is a view on a different scale, showing a cross section of a device for holding the breech block upon the base plate.

Fig. 5 is a like view, showing the device during the insertion or the removal of the breech block.

Fig. 6 is a general view on another scale, showing the apparatus when set in battery.

Fig. 7 is a like view showing the apparatus after the first shots have been fired, the plate being firmly anchored in the ground.

Fig. 8 is a diagrammatic plan view showing the said plate in use for firing in all directions.

Figs. 9 and 10 show respectively, by way of example, two forms of construction of a two-legged mount according to the invention.

Fig. 11 shows a two-legged cannon support of the known type.

Figs. 12 and 12ª show a support with one leg only according to the invention, adapted for use upon a motor traction platform.

Fig. 13 shows by way of example of construction, a device whereby the tube is made independent of its mount, and Fig. 14 shows a modification of this device.

The base plate may consist of cast steel, malleable cast iron, or preferably of pressed or forged steel plate upon which the lower flanges and the piece comprising the upper sockets are secured by autogeneous welding, riveting, electric welding, or any other suitable means.

The main portion 1 is suitably ribbed and is rearwardly bent to form a spade 2 whose lower part is preferably cut out at 3 so that it may be more readily driven into the ground. The flanges 4, which are connected to the main portion, strengthen and complete the action of the spade 2 and maintain the plate in the transverse direction, thus providing for the lateral firing when the said plate is anchored in the ground.

The plate is anchored to the earth by means of its edges 5, the flanges 4 and the spade 2 which constitute a rigid device adapted to be more or less driven into the ground by the recoil. The spade 2 and the vertical parts 5 may be disposed at the edges of the plate or under the plate at a certain distance from the edges. At the upper part of the main portion 1 and at right angles to the spade, the socket member 6 is secured and strengthened by the ribs 7 which uniformly distribute the efforts of the recoil.

The sockets may be trimmed in such manner that the ball of the cannon breech can only enter its socket and be disposed therein through a channel the axis of which is sufficiently oblique. Obviously the said ball can only be removed from its socket through the same channel and in the said oblique direction.

The breech-block may also be held in the hemispherical sockets of the base plate by placing coil springs above the said sockets in a longitudinal, transverse or oblique direction, so that the breech-block must move the springs aside in order to enter the sockets. The tension of the springs is such that the upward motion of the cannon tube and breech after the reaction upon the ground will be insufficient to bring the said ball out of its socket. Due to the effort exercised by the gunner upon the cannon tube, the ball can be readily removed from its socket and the apparatus taken apart.

Fig. 4 shows by way of example a cross section of the said fastening device, in which the breech-block is held upon the bottom of the recess 8 by the tension of two longitudinal springs 9 which are suitably disposed on the piece 6.

Fig. 5 shows the position of the springs 9 when the breech 10 is inserted into the socket 8 or is removed therefrom.

The said device may be improved by the addition of lateral ramps and tappets 9ª, 9ᵇ (Fig. 2ª) to increase the adhesion of the said springs upon the spherical end of the said breech block. The ball is rotatable in its socket with a certain freedom of motion, so that the cannon may be aimed in the proper direction. Since the said piece 6 comprises a plurality of recesses or sockets and is at right angles to the spade, with the optional addition of lateral sockets, and is mounted on a rigid base which is provided with means by which it may be firmly anchored in the ground, the cannon may be fired in all directions around the base plate.

When the appartus is set in battery in a new firing position, it is simply necessary to dispose the plate upon the ground, as shown in Fig. 6, and to insert the ball end of the breech into one of the sockets. Whatever may be the nature of the ground and whether it be hard as in a road or soft as in ploughed fields, after the first few rounds the whole or a part of the spade 2, the flanges 4 and the edges 5 will be driven into the ground, so that the plate will be anchored in the ground sufficiently to enable the firing to be continued immediately without any sliding of the base plate by which the aim would be affected (Fig. 7), this being true for all directions about the plate.

Further, since the said breech ball is held automatically in its socket, the elastic reaction of the ground after the recoil will not cause the breech to spring out of its socket, so that there will be no prejudice to the sighting of the cannon.

The base plate may also be set in position by digging into the ground before the cannon is set in battery.

It should be further noted that one of the said sockets is forwardly inclined and the second rearwardly inclined; the middle socket has its axis perpendicular to the top part of the base plate; additional sockets may be provided which can be inclined to the right or left.

I am thus enabled, for all positions of the apparatus, to fire the cannon at large or small angles, and may turn it entirely around the base plate which becomes anchored in the ground after the first firing.

Fig. 8 is a diagrammatic view showing the arrangement of the base plate for firing in all directions. In the practical construction, the plate may be round, oval, square or polygonal. The main top part 1, the upper ribs, lower flanges 4, the spade 2 and the socket carrying piece 6 may all be cast in one, or may be made of separate pieces which are secured together by suitable means so as to form a whole which has the approved construction shown in Figs. 1, 2, 3 and the following figures, but may present differences in shape, material and method of execution. The means for securing the breech by ball and socket may be replaced by other suitable means such as a Cardan device or the like which provides for the rotation and for the angular motion of the cannon tube in all directions.

In all cases, the base plate may as above stated be constructed with ribs, spades and flanges if the said plate is intended to be placed upon the ground for firing purposes without any preliminary digging.

When the apparatus is to be mounted on the flooring of a motor traction vehicle or the like, the base plate is accordingly modified by eliminating the spades and flanges, so that it may be mounted at the proper point on the said flooring of the vehicle, so that the cannon may be fired in all directions.

The invention further relates to a cannon mount which is adapted to the configuration of the various grounds; the said mount may comprise two legs placed on the ground or on a wheeled carriage, or one leg or two legs mounted on a platform or adapted to rotate as on pivot, or like disposition.

With the apparatus carried by these different mounts, the invention consists in effecting by the movement or the deformation of one or more special members, the angular displacement upon the aforesaid cannon mount of a pivoting device or cradle which supports the device for sighting in direction and for sweeping fire, so that this part of the cannon mount can be brought back to the horizontal position when desired.

Figs. 9 and 10 show by way of example a bipod mount in accordance with the invention.

The legs 21 and 22 are movable on the pivot or pivots 23 whereby they may be suitably spread, the distance being limited by a chain, a rod or the like 24, and the apparatus may thus assume the positions shown by way of example in Figs. 9 and 10.

The element A, which provides for the sighting in direction and the sweeping fire on the said mount, is movable on one or two pivots 23, so that the legs 21 and 22 may take the proper positions for the equilibrium of the apparatus. The third supporting point for the device consists of the breech-block which fits into one of the recesses or sockets in the base plate which is placed on the ground or sunk below the surface if necessary (Figs. 6 and 7).

Since the mount is in equilibrium on the ground, it will always be feasible, by acting upon the rear shank or end $A^1$ of the element A, to pivot the said element so as to bring its axis $A^2$ into the horizontal position.

Figs. 9 and 10 show by way of example the means employed for this adjustment.

A link $B^1$ is pivoted at one end to a fixed point $B^2$ of the shank $A^1$ and is connected at the other end with a pivot pin mounted on the clamping ring $B^3$ which is slidable on the leg 22 for example and may be clamped in any position. The inverse disposition might be utilized. The link $B^1$ consists of a sleeve coacting with two rods which are threaded in opposite directions. By turning the said sleeve in either direction the link $B^1$ can be lengthened or shortened at will.

By displacing the ring $B^3$ along the leg 23 for the rough adjustment, and by varying the length of the link $B^1$ for the final adjustment, the shank $A^1$ and the device A is pivoted on the pivot or pivots 23, so that the axis $A^2$ may always be brought to the horizontal position, this being controllable by means of a level indicator mounted on the device A or on the sight C.

When the apparatus is to be set in battery, for instance as shown in Figs. 9 and 10, the advantage obtained by bringing the axis $A^2$ into the horizontal position is at once apparent. In addition to the proper stability of the apparatus, the optical axis of the sight C will thus be brought in the vertical position in all cases, since the said axis is perpendicular to the axis $A^2$ by construction. This obviates all errors in sighting and all abnormal deflections which may be found when firing and chiefly with cannon employed for curved fire, if the optical axis of the sight is not parallel with the firing plane, this being vertical by definition.

The setting of the apparatus in battery upon sloping or like ground with the use of a bipod mount with fixed spacing of the legs, as in the type in current use, is shown diagrammatically in Fig. 11.

In this arrangement, the sight C may be mounted, through the medium of a yielding connection using the inertia of the mount upon the clamping collar D which secures the cannon tube to the mount. The sight C may be moved coaxially with the cannon tube in order to bring its optical axis into the vertical position, but since the axis $A^2$ is not horizontal, any variation in the firing angle in order to modify the range will cause a lateral deflection of the tube and the sighting in direction will thus be changed. In like manner, any change in sighting in direction will vary the firing angle, and the range will thus be more or less varied, so that it is not easy to regulate the firing upon a given target.

To obviate such defects, it is quite necessary to restore the part of the mount forming the cradle for the cannon tube into the horizontal position and not to act upon the sight itself, which gives only an approximate result.

According to my invention, this action upon a part of the mount is effected by the simple and convenient device which is shown, only by way of example in the drawings.

The link $B^1$ may be replaced by a toothed sector or any other like means; the two pivots 23 may be replaced by a single pivot and the shape and disposition of the device A may also be changed. The link $B^1$ might form part of one of the legs or of one of the bracing members supporting the device A.

The improved artillery apparatus according to the invention may be mounted on wheels, and herein the legs are replaced by two draw bars.

Figs. 12 and $12^a$ show a support with a single leg according to the invention, which is adapted to be mounted upon the platform of a motor or other vehicle. The whole support is pivoted on the axis $x$—$x'$. The pivotation for placing the axis $A^2$ in the horizontal position is effected by turning the handle $B^3$ in order to lengthen or shorten the link $B^1$ which is pivoted upon the axle $B^0$, thus actuating the leg $A^1$ which turns on the pivot $23^a$.

A link analogous to the link $B^1$ (Figs. 8 and 9) but having the vertical position might as well be employed to bring the axis $A^2$ into the horizontal position.

For all cannon mounted upon wheels or otherwise, the horizontal position for the cradle can be obtained for instance by means of a toothed sector upon which a pinion may be displaced while imparting an angular movement to a member in rigid connection with the cradle and optionally comprising an element for sweeping fire and for sighting in direction which may be substituted for the member A of the aforesaid devices.

When a sight rigidly supported by the cannon is employed with a relatively light apparatus adapted for curved firing and having no brakes, it is quite necessary to avoid all damage to the sight, during the firing operations, and the sight should receive no abrupt motion from the tube during the recoil nor when the tube again moves forward under the effect of the elastic reaction of the ground.

The tube may therefore be simply laid without pressure within a trough like support pivoted to the cradle, but this method is imperfect inasmuch as the cannon tube may be subject to a jumping or rearing action when firing at great angles.

To hold the cannon tube to the mount use may be made of a clamping collar, or a collar which is slidable on the said tube by means of balls or rollers. The maintenance of the tube upon the mount through the medium of such collars is assured by a yielding connection device which employs the inertia of the mount in order that the latter shall not be drawn with the tube during the firing.

In the apparatus in accordance with the invention, the tube is subjected to movements of very small amplitude only and for a very short duration, for the following reasons:

1. During the recoil, the tube is supported by the plate which has a large surface and is well anchored in the ground, which latter will absorb the stresses, by reason of its plastic nature.

2. During the return of the said plate and the cannon tube under the effect of the elastic reaction of the ground, since these two elements are secured together they will return at the same time and the tube will not be subjected to the jumping motion which takes place with the use of reaction plates which are not fastened to the tube.

The various connecting devices which will be hereinafter described by way of example are sufficient in practice to render the mount motionless during the firing, and in this manner a sight of great accuracy may be employed.

As shown in Fig. 13, the cannon tube T is held in position by the collar U through the medium of one or more springs R of suitable construction which form a yielding connection. The said device might also consist of one or more V-shaped springs connecting a slidable collar, forming part of the mount, with an attaching member secured to the tube, whereby the tube T will be better guided and maintained upon the mount.

Fig. 14 shows a yielding connection consisting of a collar L which is slidable on the tube T by means of the rollers or balls M, and springs $R^1$ and $R^2$ which are maintained respectively between the shoulders O and O' of the tube and the washers P and P' slidable upon the tube; said springs provide for the connection between the tube T and the mount S, and will operate towards the front or rear in order to free the support from the more or less extensive and rapid movements of the tube T.

The springs $R^1$ and $R^2$, instead of being placed upon the tube T, may be disposed at an angle with the axis of the tube, or parallel therewith, and may be of a smaller size than is shown in Fig. 14. In this event they may be replaced by any suitable device which will serve in the same manner for connection purposes, i. e. which act as retarding means for the action of the tube upon the mount; such means may be for instance an air or an oil dash-pot, an india rubber member working by traction or compression, or both, by which I obtain the same or analogous results whereby I may dispose upon the apparatus a sight which is mounted on the mount or on the cannon tube itself, and in this latter case the connection device is interposed between the tube and the sight.

It will now be easily understood that the use of the base plate and of the yielding connection device permits of utilizing a sight of great accuracy comprising for instance, as those used in field artillery, means for sighting in direction, for sighting in elevation, and for indirect sighting by means of front or rear aiming points, and levels for controlling the horizontal position of the various parts.

As concerns the tube itself, the latter may be entirely cylindrical and bored and rectified with great accuracy, the breech block being preferably screwed upon the end of the tube, thus forming a hoop. The bore may obviously be smooth or it may be rifled.

The projectile may be fired according to the known method of auto-percussion, the striker having preferably an adjustable position so as to permit of substituting for auto-percussion the usual percussion by means of a striker controlled by any suitable known means. Obviously, the firing mechanism may be of any desired known construction, according to circumstances.

Obviously, the devices above specified by way of example are susceptible of all necessary modifications without departing from the principle of the invention.

Having now described my invention, what I claim as new and desire to secure by Letters Patent is:

1. In an infantry gun, the combination of a mount, a cradle pivoted to said mount, a traversing mechanism on said cradle, and adjusting means operatively connected to said mount and to said cradle substantially in the vertical plane of said traversing mechanism for adjusting the angular position of the latter in said vertical plane.

2. In an infantry gun the combination of a cradle, a traversing mechanism on said cradle, a mount pivoted to said cradle, a first rod having one end connected to said cradle, a second rod having one end slidably connected to said mount, both free ends of said rods being threaded at different pitches, means for securing the slidable end of said second rod in selective positions on said mount and a threaded sleeve fitting said free ends and adapted to operatively cooperate with said threaded rods.

3. In an infantry gun the provision of a light undeformable base plate comprising the combination of a thin main plate of large surface and corrugated cross section, a peripheral rib, a large rear turned down flange and longitudinal ribs connecting said rear flange to the front edge, said flange and said ribs being adapted to act respectively as transverse and longitudinal anchoring members.

4. In an infantry gun the combination of a base plate, a breech head receiving member secured to the top portion of said plate, and a plurality of sockets provided in said member along the longitudinal axis of said plate and in which the breech head is adapted to rest, the axes of the respective sockets being differently inclined upon the vertical.

5. In an infantry gun the combination of a base plate, a breech head receiving member secured to the top portion of said plate, a number of sockets provided in said member along the longitudinal axis of said plate and in which the breech head is adapted to rest, and means for automatically locking the breech head in either of said sockets.

6. In an infantry gun the combination of a base plate, a breech head receiving member secured to the top portion of said plate, a number of sockets provided in said member and in which the breech head is adapted to rest, and at least one member associated with said sockets and adapted to be automatically moved away by said breech head when the latter enters its corresponding socket and to automatically resume its initial position when said breech head is in place in said socket, for automatically locking said breech head in said socket.

7. In an infantry gun the combination of a base plate, a breech head receiving member secured to the top portion of said plate, a number of sockets provided in said member and in which the breech head is adapted to rest, and longitudinal traction springs slightly extending inwardly over the edges of said sockets.

8. In an infantry gun the combination of a base plate, a breech head receiving member secured to the top portion of said plate, a number of sockets provided in said member and in which the breech head is adapted to rest, longitudinal traction springs slightly extending inwardly over the edges of said sockets, and members disposed along said springs and adapted to deform the latter against said breech head, thereby increasing the surface of contact of same with said breech head.

9. In an infantry gun the combination of a light undeformable base plate upon which the breech head is adapted to rest, a mount, a gun tube, a cradle pivoted on said mount for said tube, means operatively connecting said cradle to said mount for controlling the horizontal position of said cradle, and a yielding connection between said gun tube and said cradle.

10. In an infantry gun the combination of a light undeformable base plate upon which the breech head is adapted to rest, a mount, a gun tube, a cradle pivoted on said mount for said tube, means operatively connecting said cradle to said mount for controlling the horizontal position of said cradle, a sighting device and a yielding connection between said gun tube and said sighting device.

11. In an infantry gun the combination of a light undeformable base plate upon which the breech head is adapted to rest, a mount, a gun tube, a cradle pivoted on said mount for said tube, means operatively connecting said cradle to said mount for controlling the horizontal position of said cradle, a ring rigidly connected to said cradle, and yielding means connecting said ring to said tube.

In testimony whereof I have signed my name to this specification.

EDGAR WILLIAM BRANDT.